(12) United States Patent
Fang et al.

(10) Patent No.: US 12,430,771 B2
(45) Date of Patent: Sep. 30, 2025

(54) LIGHT FIELD RECONSTRUCTION METHOD AND APPARATUS OF A DYNAMIC SCENE

(71) Applicant: Tsinghua University, Beijing (CN)

(72) Inventors: Lu Fang, Beijing (CN); Dawei Zhong, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 396 days.

(21) Appl. No.: 17/932,544

(22) Filed: Sep. 15, 2022

(65) Prior Publication Data

US 2023/0086928 A1  Mar. 23, 2023

(30) Foreign Application Priority Data

Sep. 17, 2021  (CN) .................. 202111090962.7

(51) Int. Cl.
*G06T 7/20* (2017.01)
*G06T 15/50* (2011.01)

(52) U.S. Cl.
CPC .............. *G06T 7/20* (2013.01); *G06T 15/506* (2013.01)

(58) Field of Classification Search
CPC ................................ G06T 15/506; G06T 7/20
See application file for complete search history.

(56) References Cited

U.S. PATENT DOCUMENTS

| 2021/0117662 A1* | 4/2021 | Wang .................. G06V 10/454 |
| 2022/0222895 A1* | 7/2022 | Li ......................... G06T 19/20 |
| 2022/0301295 A1* | 9/2022 | Livet ..................... G06N 3/045 |

FOREIGN PATENT DOCUMENTS

| CN | 111739161 A | 10/2020 |
| CN | 111968165 A | 11/2020 |

OTHER PUBLICATIONS

VolumeDeform: Real-time Volumetric Non-rigid Reconstruction Matthias Innmann1 Michael Zollhofer (Year: 2016).*
BodyFusion: Real-time Capture of Human Motion and Surface Geometry Using a Single Depth Camera Tao Yu1. 2017 IEEE International Conference on Computer Vision (Year: 2017).*
CNIPA, First Office Action for CN Application No. 202111090962.7, Nov. 1, 2021.

* cited by examiner

*Primary Examiner* — John Villecco
*Assistant Examiner* — Alexander John Rodgers
(74) *Attorney, Agent, or Firm* — Hodgson Russ LLP

(57) ABSTRACT

The light field reconstruction method includes: obtaining a human segmentation result via a pre-trained semantic segmentation network, and obtaining an object segmentation result according to a pre-obtained scene background; fusing multiple frames of depth maps to obtain a geometric model, obtaining a complete human model according to a pre-trained human model completion network, and registering the models by point cloud registration and fusing the registered models to obtain an object model, so as to obtain a complete human model with geometric details and the object model; tracking motion of a rigid object through point cloud registration; reconstructing the complete human model with geometric details through a human skeleton tracking and a non rigid tracking of human surface nodes; and performing a fusion operation in time sequence and obtaining a reconstructed human model and a reconstructed rigid object model through the fusion operation.

16 Claims, 4 Drawing Sheets

LIGHT FIELD RECONSTRUCTION METHOD AND APPARATUS OF A DYNAMIC SCENE

CROSS-REFERENCE TO RELATED APPLICATION

This application claims priority to Chinese Patent Application No. 202111090962.7, filed Sep. 17, 2021, the entire disclosure of which is incorporated by reference herein.

TECHNICAL FIELD

The present disclosure relates to the technical field of computer vision, particularly to a light field reconstruction method and apparatus of a dynamic scene.

BACKGROUND

AR technology first needs high-quality modeling of a real scene, and then can perform various operations on a reconstructed model in a virtual space. However, the real dynamic scene contains complex interactions between human and objects, so it is still difficult for a light field reconstruct of such a dynamic scene. Previous methods need to use complex and expensive camera arrays to collect data, and then use dedicated servers for offline computing to obtain high-quality reconstruction results. However, such devices are difficult to popularize.

A high quality real-time three-dimensional human reconstruction is of great significance for immersive VR/AR applications. However, with input of monocular RGBD, high-quality dynamic human reconstruction is still a difficult problem, especially when there is human-object interaction and occlusion, the reconstruction result will be unstable. Early model-based methods are subject to pre-scanned templates or inefficient runtime performance, which are not suitable for daily interactive applications. High-quality human reconstruction solutions can be provided through a large number of cameras and specialized computing servers. These methods can solve challenging interaction and occlusion blur problems through a large number of cameras and multi-view geometry calculation. However, their low computing efficiency and need of expensive and cumbersome data acquisition equipment lead to their inability to be applied to daily use. Monocular stereo vision method uses the most portable commercial RGBD camera to collect data, and constructs a complete model through the time fusion pipeline. Early processing of general dynamic scenes does not use prior information of the human body, the reconstructed dynamic object needs to move very slowly and can not have severe occlusion, thus the result is not robust. In order to enhance the robustness of human reconstruction, the new work introduces a prior of human parametric model to deal with more complex motion. However, these methods cannot reconstruct a human-object interaction scene, and are prone to fail when there is occlusion.

Traditional technology has the following disadvantages:
1. The model learned from a single RGB or RGB model is based on a prior of training data, which is not completely consistent with the real situation. The reconstructed model has a good effect in front observation, but often has a poor effect in other aspects. The reconstructed model is lack of smoothness in time sequence.
2. For the processing of the object, although the dynamic reconstruction method without adding human prior can reconstruct the human and object at the same time, it requires that the motion scene is very simple and there is no obvious occlusion in the scene, otherwise it is very easy to fail to track. However, the method of introducing human prior information can not reconstruct the object interacted with human, and it is easy to fail to track when there is object occlusion.

SUMMARY

The present disclosure aims to solve at least one of the technical problems in the related art to a certain extent.

For this end, a first purpose of the present disclosure is to provide a light field reconstruction method of a dynamic scene, to obtain a reconstruction model of a human-object interaction dynamic scene from input of a monocular RGBD camera. The occlusion problem caused by the human-object interaction scene is optimized. During a dynamic human reconstruction, a rigid object is also reconstructed, the robustness of the human model in the case of occlusion is improved through prior information of the reconstructed object model. At the same time, a prior of time sequence information is introduced to improve the robustness of human skeleton tracking.

A second purpose of the present disclosure is to provide a light field reconstruction apparatus of a dynamic scene.

For the above purposes, a first aspect of embodiments of the present disclosure provides a light field reconstruction method of a dynamic scene, including: obtaining a human segmentation result via a pre-trained semantic segmentation network, and obtaining an object segmentation result according to a pre-obtained scene background; fusing multiple frames of depth maps of the human segmentation result and the object segmentation result to obtain a geometric model, obtaining a complete human model according to a pre-trained human model completion network, and registering the models by point cloud registration and fusing the registered models to obtain a fused object model, so as to obtain a complete human model with geometric details and the object model; tracking motion of a rigid object through point cloud registration; reconstructing the complete human model with geometric details through a human skeleton prior and non rigid point cloud tracking; and performing, after obtaining a motion field of the complete human model with geometric details and motion of the rigid object, a fusion operation in time sequence and obtaining a reconstructed human model and a reconstructed rigid object model through the fusion operation.

In addition, the light field reconstruction method of a dynamic scene of the above embodiments of the present disclosure can have the following technical features.

Further, in an embodiment of the present disclosure, the method further includes: removing a wrong part in the human segmentation result according to a projection result of the reconstructed rigid object under a current visual angle.

Further, in an embodiment of the present disclosure, obtaining the complete human model according to the pre-trained human model completion network includes: triggering to process the human model of a current frame with a trained depth learning network to obtain a complete human model, when an average weight of the geometric model reaches a specific preset threshold.

Further, in an embodiment of the present disclosure, the motion of the rigid object is obtained by solving an optimization function, the optimization function for point cloud registration includes two optimization terms of color and geometry, expressions of the optimization function are as follows:

$$E_{object}(T) = \lambda_{color} E_{color} + \lambda_{geo} E_{geo}$$

$$E_{color} = \sum_{i \in N} \sum_{(p,q) \in \mathcal{R}} (C_p(f(T_i q)) - C(q))^2$$

$$E_{geo} = \sum_{i \in N} \sum_{(p,q) \in \mathcal{R}} (n_p^T(p - T_i q))^2$$

where, N is the number of objects, R is a set of corresponding points found via closest searching, p and q are the corresponding points of frame t and frame t−1, function C returns the color q of the point, $C_p$ is a pre-computed function continuous on a tangent plane of the point p, function f projects a three-dimensional point to the tangent plane, $T_i$ is the motion of the rigid object, $\lambda_{color}$ is a coefficient of the color optimization item and set to 0.1, $\lambda_{geo}$ is a coefficient of the geometric optimization term and set to 0.9, $E_{color}$ is a calculation expression of the color optimization term, which is calculated from color differences of adjacent points, and $E_{geo}$ is a calculation expression of the geometric optimization term, which is calculated from spatial position differences of adjacent points.

Further, in an embodiment of the present disclosure, the tracking through the human skeleton includes: tracking through the human skeleton prior and non rigid point cloud, and adding new constraints when solving a position of a human skeleton node:

$$E_{inter} = \lambda_{gmm} E_{gmm} + \lambda_{lstm} E_{lstm} + \lambda_{sp\_h1} E_{sp\_h}$$

where, $E_{gmm}$ is human pose data collected under an interaction between human and object, $E_{lstm}$ is a constraint item in time sequence, $E_{sp\_h}$ is a geometric intersection term, $\lambda_{gmm}$, $\lambda_{lstm}$, $\lambda_{sp\_h1}$ are coefficients of optimization terms respectively.

Further, in an embodiment of the present disclosure, the non rigid tracking of human surface nodes includes:
jointly solving an optimization equation, wherein optimization variables are human shape $\beta_0$ and pose $\theta_0$, and ED non rigid motion field $G_0$, and the optimization equation is:

$$E_{comp}(G_0, \beta_0, \theta_0) = \lambda_{vd} E_{vdata} + \lambda_{md} E_{mdata}$$

where, the first item is a voxel data item, wherein $\lambda_{vd}$ is an optimization coefficient, $E_{vdata}$ defines an error between a SMPL model and a reconstructed geometric model:

$$E_{vdata}(\beta_0, \theta_0) = \sum_{\tilde{v} \in T} \psi(D(W(T(\tilde{v}; \beta_0, \theta_0); \beta_0, \theta_0)),$$

where, input of D(.) is coordinates of a point, and output is a SDF value of a bilinear interpolation of the coordinates of the point in the TSDF volume, $\psi(.)$ represents a robust Geman-McClure penalty function.

Further, in an embodiment of the present disclosure, the mutual action term $E_{mdata}$ is represented by the following point to plane distance:

$$E_{mdata} = \sum_{(\tilde{v},u) \in C} \psi(n_u^T(W(T(\tilde{v}; \beta_0, \theta_0)) - u)) + \sum_{(\tilde{v}_c,u) \in P} \psi(n_u^T(\tilde{v}_c - u)),$$

where, C is a closest point pair set of points $\bar{v}$ on the SMPL and points u on a complete model, P is a closest point pair set of vertexes $\tilde{v}_c$ of a partial model and points u on the complete model, and $n_u$ is a normal vector of a point.

Further, in an embodiment of the present disclosure, for each 3D voxel v, $\tilde{v}$ represents a position warped through ED non rigid motion, N(v) represents the number of non empty voxels neighboring the voxel, D(v) represents a TSDF value of v;
calculating a current SDF value d(v) and updating a weight by the following formulas:

$$d(v) = (u - \tilde{v}) \text{sgn}(n_u^T(u - \tilde{v})), \quad w(v) = 1/(1 + N(v)).$$

where, u is a three-dimensional point on the complete model corresponding to the $\tilde{v}$, $n_u$ is its normal vector, sgn(.) is a sign function and determined by positive and negative SDF values.

Further, in an embodiment of the present disclosure, through the SDF value and updating the weight, fusing according to a fusion strategy, and using a marching cubes algorithm, a complete mesh model with geometric details is obtained, the fusion strategy is:

$$D(v) \leftarrow \frac{D(v)W(v) + d(v)w(v)}{W(v) + w(v)}, \quad W(v) \leftarrow W(v) + w(v).$$

where, D(V) represents a TSDF value of v, and W(v) represents a current accumulative weight.

According to the light field reconstruction method of a dynamic scene of embodiments of the present disclosure, a human segmentation result is obtained via a pre-trained semantic segmentation network, and an object segmentation result is obtained according to a pre-obtained scene background; multiple frames of depth maps of the human segmentation result and the object segmentation result are fused to obtain a geometric model, a complete human model is obtained according to a pre-trained human model completion network, and the models are registered by point cloud registration and the registered models are fused to obtain a fused object model, so as to obtain a complete human model with geometric details and the object model; motion of a rigid object is tracked through point cloud registration; the complete human model with geometric details is reconstructed through a human skeleton prior and non rigid point cloud tracking; and after obtaining a motion field of the complete human model with geometric details and motion of the rigid object, a fusion operation is performed in time sequence and a reconstructed human model and a reconstructed rigid object model are obtained through the fusion operation. The present disclosure improves the robustness of dynamic light field reconstruction in the human-object interaction scene, through point cloud tracking of the rigid object and reconstructing a three-dimensional model, then constraining the human skeleton tracking based on prior information of the model after obtaining the three-dimensional model. The prior of time sequence information and pose prior of human-object interaction collected are used to enhance the human skeleton tracking effect in the case of object occlusion, so as to obtain the robust human skeleton tracking in the case of occlusion, which realizes a light field reconstruction of a dynamic scene in the case of occlusion.

For the above purposes, a second aspect of embodiments of the present disclosure provides a light field reconstruction apparatus of a dynamic scene, including a segmenting module, a registering module, a tracking module, a reconstructing module, and a fusing module. The segmenting module is configured to obtain a human segmentation result via a pre-trained semantic segmentation network, and obtain an object segmentation result according to a pre-obtained scene background. The registering module is configured to fuse multiple frames of depth maps of the human segmentation result and the object segmentation result to obtain a geometric model, obtain a complete human model according to a pre-trained human model completion network, and register the models by point cloud registration and fuse the registered models to obtain a fused object model, so as to obtain a complete human model with geometric details and the object model. The tracking module is configured to track motion of a rigid object through point cloud registration. The reconstructing module is configured to reconstruct the complete human model with geometric details through a human skeleton prior and non rigid point cloud tracking. The fusing module is configured to perform, after obtaining a motion field of the complete human model with geometric details and motion of the rigid object, a fusion operation in time sequence and obtaining a reconstructed human model and a reconstructed rigid object model through the fusion operation.

According to the light field reconstruction apparatus of a dynamic scene of embodiments of the present disclosure, with the segmenting module, a human segmentation result is obtained via a pre-trained semantic segmentation network, and an object segmentation result is obtained according to a pre-obtained scene background; with the registering module, multiple frames of depth maps of the human segmentation result and the object segmentation result are fused to obtain a geometric model, a complete human model is obtained according to a pre-trained human model completion network, and the models are registered by point cloud registration and the registered models are fused to obtain a fused object model, so as to obtain a complete human model with geometric details and the object model; with the tracking module, motion of a rigid object is tracked through point cloud registration; with the reconstructing module, the complete human model with geometric details is reconstructed through a human skeleton prior and non rigid point cloud tracking; and with the fusing module, after obtaining a motion field of the complete human model with geometric details and motion of the rigid object, a fusion operation is performed in time sequence and a reconstructed human model and a reconstructed rigid object model are obtained through the fusion operation. The present disclosure improves the robustness of dynamic light field reconstruction in the human-object interaction scene, through point cloud tracking of the rigid object and reconstructing a three-dimensional model, then constraining the human skeleton tracking based on prior information of the model after obtaining the three-dimensional model. The prior of time sequence information and pose prior of human-object interaction collected are used to enhance the human skeleton tracking effect in the case of object occlusion, so as to obtain the robust human skeleton tracking in the case of occlusion, which realizes a light field reconstruction of a dynamic scene in the case of occlusion.

The beneficial effects of the present disclosure are:

The present disclosure realizes the light field reconstruction of the dynamic scene in the human-object interaction scene based on the monocular RGBD camera through designing algorithms, and specifically realizes the use of the RGBD camera (RGB+depth image) to achieve a fast, complete, accurate and high-quality dynamic human 3D model and rigid object model. Specifically:

1) The rigid object is reconstructed through point cloud registration;
2) The human body is reconstructed by human skeleton prior and non rigid tracking;
3) The reconstructed rigid object constrains the tracking results of the human skeleton in: space to improve robustness. In the case of people-object interaction and mutual occlusion, the dynamic scene model can be obtained from the light field reconstruction results.

Additional aspects and advantages of the present disclosure will be partially described in the following description, and some will become apparent from the following description, or learned from the practice of the present disclosure.

BRIEF DESCRIPTION OF THE DRAWINGS

The above-mentioned and/or additional aspects and advantages of the present disclosure will become apparent and easy to understand from the following description of embodiments in combination with the accompanying drawings, in which.

DETAILED DESCRIPTION

Figure 1:
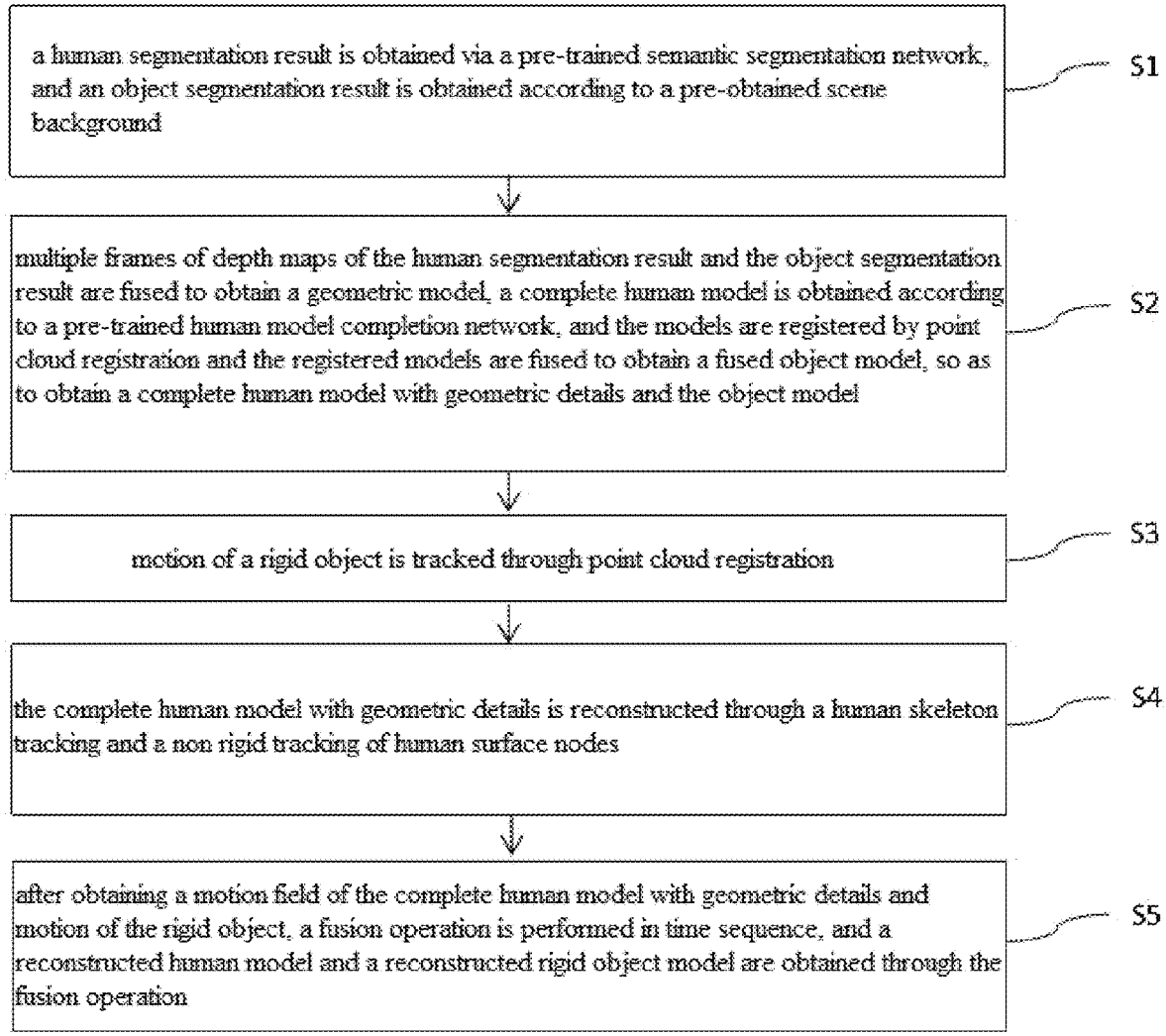
FIG. 1 is a flowchart of a light field reconstruction method of a dynamic scene according to an embodiment of the present disclosure.

Embodiments of the present disclosure are described in detail below. The examples of the embodiments are shown in the drawings, in which the same or similar labels throughout represent the same or similar elements or elements with the same or similar functions. The embodiments described below with reference to the drawings are exemplary and are intended to explain the present disclosure, but cannot be understood as a limitation of the present disclosure.

A light field reconstruction method of a dynamic scene and a light field reconstruction apparatus of a dynamic scene of embodiment of the present disclosure are described below with reference to the drawings.

Figure 2:
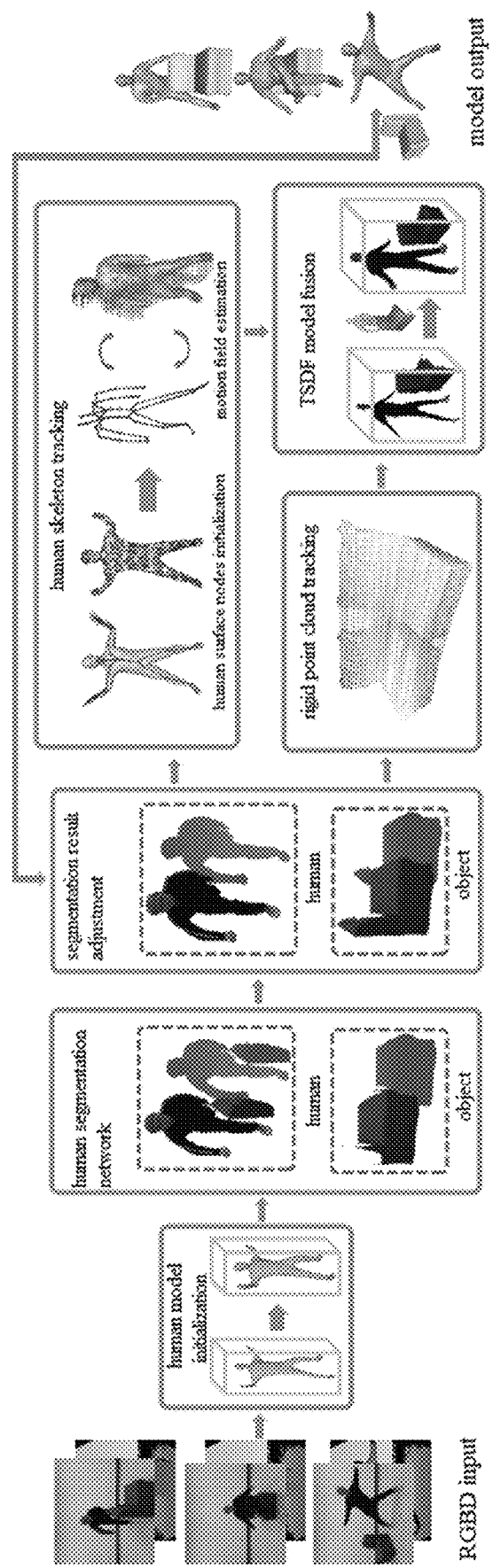
FIG. 2 is a schematic diagram of a principal design of light field reconstruction of a dynamic scene according to an embodiment of the present disclosure.
Figure 3:
FIG. 3 is a schematic diagram of a three-dimensional model reconstruction result according to an embodiment of the present disclosure.

The light field reconstruction method of a dynamic scene of embodiment of the present disclosure reconstructs a dynamic human body, through a non rigid tracking and prior information of a human skeleton under input of the monocular RGBD camera, tracking and reconstructing a rigid object through point cloud registration, and after obtaining the reconstructed rigid object, restricting a position of the human model through optimization items in space to prevent the human model from being inserted into the object model. At the same time, the result of human mask extraction in the original data is adjusted through the reconstructed rigid object model, as shown in FIG. 2.

FIG. 1 is a flowchart of a light field reconstruction method of a dynamic scene according to an embodiment of the present disclosure.

As illustrated in FIG. 1, the method includes the following steps.

At block S1, a human segmentation result is obtained via a pre-trained semantic segmentation network, and an object segmentation result is obtained according to a pre-obtained scene background.

Specifically, in the present disclosure, the semantic segmentation network is first used to obtain human segmented part, and the object in the scene is obtained according to the known scene background and the human segmentation result.

Further, the human segmentation result of the semantic segmentation network sometimes incorrectly contain the object, the wrong part in the human segmentation result is removed according to a projection result of a reconstructed rigid object under a current visual angle.

At block S2, multiple frames of depth maps of the human segmentation result and the object segmentation result are fused to obtain a geometric model, a complete human model is obtained according to a pre-trained human model completion network, and the models are registered by point cloud registration and the registered models are fused to obtain a fused object model, so as to obtain a complete human model with geometric details and the object model.

It can be understood that, firstly, the human body model with high-quality geometric details is obtained: with single visual angle non rigid dynamic reconstruction technology (ED node-graph based), the geometric model (TSDF form) of a current frame is obtained by fusing the multiple frames of depth maps, for example a partial model of the front of the human body obtained from 1~3 s of front video of the human body.

Secondly, the complete human model is obtained: once an average weight of TSDF volume reaches a certain threshold (32, adjustable), triggering to process the current frame with a trained depth learning network to obtain a complete human model. The specific implementation is as follows.

The network model refers to PIFu, which is composed of an image encoder and a MLP. The difference is that the input is not only RGB, but also D (depth map) and human parsing (segmentation map of human body parts), this aims to obtain a model that is closer a real situation in scale and human pose (that is, the above fused geometric model). The training data set can be obtained by rendering a large number of three-dimensional human models to obtain the depth and RGB and segmenting human body parts to obtain the human parsing, and then the depth learning model can be obtained through the changed PIFu network training.

Finally, the fusion of the human model is obtained: after obtaining the above two models, the two models are registered by point cloud registration, and then the registered models are fused, that is, the reconstructed incomplete model is supplemented by the learned complete model to form a complete human model with geometric details.

At block S3, motion of a rigid object is tracked through point cloud registration.

It can be understood that, for the rigid object, its motion is tracked through point cloud registration, the optimization function for point cloud registration includes two optimization terms of color and geometry, expressions of the optimization function are as follows:

$$E_{object}(T) = \lambda_{color}E_{color} + \lambda_{geo}E_{geo}$$

$$E_{color} = \sum_{i \in N} \sum_{(p,q) \in \mathcal{R}} (C_p(f(T_iq)) - C(q))^2$$

-continued
$$E_{geo} = \sum_{i \in N} \sum_{(p,q) \in \mathcal{R}} (n_p^T(p - T_iq))^2$$

where, N is the number of objects, R is a set of corresponding points found via closest searching, p and q are the corresponding points of frame t and frame t−1, function C returns the color q of the point, $C_p$ is a pre-computed function continuous on a tangent plane of the point p, function f projects a three-dimensional point to the tangent plane, $T_i$ is the motion of the rigid object, $\lambda_{color}$ is a coefficient of the color optimization item and set to 0.1, $\lambda_{geo}$ is a coefficient of the geometric optimization term and set to 0.9, $E_{color}$ is a calculation expression of the color optimization term, which is calculated from color differences of adjacent points, and $E_{geo}$ is a calculation expression of the geometric optimization term, which is calculated from spatial position differences of adjacent points.

At block S4, the complete human model with geometric details is reconstructed through a human skeleton tracking and a non rigid tracking of human surface nodes.

It can be understood that, the human model can be reconstructed through a human skeleton prior and non rigid point cloud tracking, and when solving a position of a human skeleton node, new constraints are added:

$$E_{inter} = \lambda_{gmm}E_{gmm} + \lambda_{lstm}E_{lstm} + \lambda_{sp\_h1}E_{sp\_h}$$

where, $\lambda_{gmm}$, $\lambda_{lstm}$, $\lambda_{sp\_h1}$ are coefficients of optimization terms respectively, $E_{gmm}$ is human pose data collected under an interaction between human and object, a pose distribution under the interaction scene is obtained through Gaussian mixture model, and the current pose estimation is constrained to keep consistent with prior information of the Gaussian mixture model as much as possible; $E_{lstm}$ is a constraint item in time sequence, a LSTM network is trained to predict the current pose estimation based on a historical pose estimation, and the solution of the current pose estimation is constrained by a predictive value of the current pose estimation, when the human is occluded by an object, a better skeleton motion estimation can be realized based on the continuity in time sequence; $E_{sp\_h}$ is a geometric intersection term, after obtaining the rigid object model, the human and the object models are constrained to not intersect in space, so as to avoid the incorrect insertion of the human model into the object under occlusion.

Further, the non rigid tracking of the human surface node is based on non rigid motion estimation: in order to obtain more realistic non rigid motion (clothing folds, etc.), an optimization problem is solved to estimate the non rigid motion G based on the pose estimation (skeleton motion estimation). ED node graph and SMPL model are used to represent the complete human model. For any 3D vertex: $v_c$, $\tilde{v}_c$=ED($v_c$; G) represents a position warped through the ED node graph, G is a non rigid motion field. For the SMPL model, $\overline{T}$ is a unified template, T(β, θ) is a template deformed by shape and pose parameters, in which β represents the shape parameter (human shape), θ represents the pose parameter. For any vertex $\overline{v} \in \overline{T}$. W(T($\overline{v}$; β, θ); β, θ) is the 3D coordinate position after warp.

A specific operation of aligning a partial model in the form of TSDF and a complete mesh (mesh model) consists in jointly solving an optimization equation, in which optimization variables are human shape $β_0$ and pose $θ_0$, and ED non rigid motion field $G_0$ (from the TSDF partial model to the complete mesh). The optimization equation is:

$$E_{comp}(G_0,\beta_0,\theta_0)=\lambda_{vd}E_{vdata}+\lambda_{md}E_{mdata}$$

where, the first item is a voxel data item, in which $\lambda_{vd}$ is an optimization coefficient, $E_{vdata}$ defines an error between a SMPL model and a reconstructed geometric model (a partial model of TSDF volume):

$$E_{vdata}(\beta_0, \theta_0) = \sum_{\bar{v}\in\bar{T}}\psi(D(W(T(\bar{v};\beta_0,\theta_0);\beta_0,\theta_0)),$$

where, input of D(.) is coordinates of a point, and output is a SDF value of a bilinear interpolation of the coordinates of the point in the TSDF volume (smaller means closer to the plane), $\psi(.)$ represents a robust Geman-McClure penalty function.

The mutual action term $E_{mdata}$ measures a fitting from both the partial TSDF model and the SMPL model to the complete mesh, and is represented by the following point to plane distance:

$$E_{mdata} = \sum_{(\bar{v},u)\in C}\psi(n_u^T(W(T(\bar{v};\beta_0,\theta_0))-u)) + \sum_{(\bar{v}_c,u)\in P}\psi(n_u^T(\bar{v}_c-u)),$$

where, C is a closest point pair set of points $\bar{v}$ on the SMPL and points u on a complete model, P is a closest point pair set of vertexes $\tilde{v}_c$ of a partial model and points u on the complete model, and $n_u$ is a normal vector of a point, $\lambda_{mdata}$ is a coefficient of the mutual action term.

At block S5, after obtaining a motion field of the complete human model with geometric details and motion of the rigid object, a fusion operation is performed in time sequence, and a reconstructed human model and a reconstructed rigid object model are obtained through the fusion operation.

Specifically, the fusion operation needs to be performed in time sequence after obtaining the motion field of the human model and the motion of the rigid object, the fusion is performed in the TSDF domain, the complete human model and rigid object model are obtained through fusing.

It can be understood that, for each 3D voxel v, represents a position warped through ED non rigid motion, N(v) represents the number of non empty voxels neighboring the voxel, the larger the number is, the more observations are made in this part, and the more reliable it is, with the fusion of the partial models, the number from the middle to the edge becomes smaller and smaller, therefore using its inverse ratio to represent a fusion weight to achieve a seamless fusion effect. D(v) represents a TSDF value of v, W(v) represents a current accumulative weight of v.

a current SDF value d(v) is calculated and a weight is updated according to the following formulas:

$$d(v)=(u-\bar{v})\text{sgn}(n_u^T(u-\bar{v})), w(v)=1/(1+N(v)).$$

where, u is a three-dimensional point on the complete model corresponding to the $\tilde{v}$, $n_u$ is its normal vector, sgn(.) is a sign function and determined by positive and negative SDF values. Through the SDF value updating the weight, a fusion is performed according to a fusion strategy:

$$D(v) \leftarrow \frac{D(v)W(v)+d(v)w(v)}{W(v)+w(v)}, W(v) \leftarrow W(v)+w(v).$$

then through a marching cubes algorithm, a complete mesh model with geometric details can be obtained from TSDF volume.

According to the light field reconstruction method of a dynamic scene of embodiments of the present disclosure, a human segmentation result is obtained via a pre-trained semantic segmentation network, and an object segmentation result is obtained according to a pre-obtained scene background; multiple frames of depth maps of the human segmentation result and the object segmentation result are fused to obtain a geometric model, a complete human model is obtained according to a pre-trained human model completion network, and the models are registered by point cloud registration and the registered models are fused to obtain a fused object model, so as to obtain a complete human model with geometric details and the object model; motion of a rigid object is tracked through point cloud registration; the complete human model with geometric details is reconstructed through a human skeleton prior and non rigid point cloud tracking; and after obtaining a motion field of the complete human model with geometric details and motion of the rigid object, a fusion operation is performed in time sequence and a reconstructed human model and a reconstructed rigid object model are obtained through the fusion operation. The present disclosure improves the robustness of dynamic light field reconstruction in the human object interaction scene, through point cloud tracking of the rigid object and reconstructing a three-dimensional model, then constraining the human skeleton tracking based on prior information of the model after obtaining the three-dimensional model. The prior of time sequence information and pose prior of human-object interaction collected are used to enhance the human skeleton tracking effect in the case of object occlusion, so as to obtain the robust human skeleton tracking in the case of occlusion, which realizes a light field reconstruction of a dynamic scene in the case of occlusion.

Figure 4:
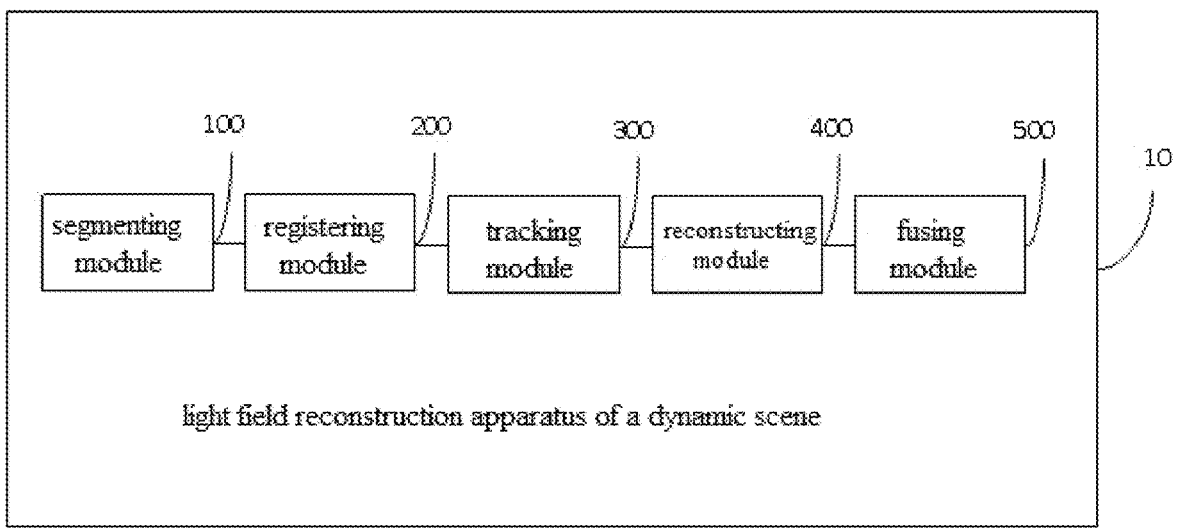
FIG. 4 is a block diagram of a light field reconstruction apparatus of a dynamic scene according to an embodiment of the present disclosure.

FIG. 4 is a block diagram of a light field reconstruction apparatus of a dynamic scene according to an embodiment of the present disclosure.

As illustrated in FIG. 4, the apparatus 10 includes a segmenting module 100, a registering module 200, a tracking module 300, a reconstructing module 400, and a fusing module 500.

The segmenting module 100 is configured to obtain a human segmentation result via a pre-trained semantic segmentation network, and obtain an object segmentation result according to a pre-obtained scene background.

The registering module 200 is configured to fuse multiple frames of depth maps of the human segmentation result and the object segmentation result to obtain a geometric model, obtain a complete human model according to a pre-trained human model completion network, and register the models by point cloud registration and fuse the registered models to obtain a fused object model, so as to obtain a complete human model with geometric details and the object model.

The tracking module 300 is configured to track motion of a rigid object through point cloud registration.

The reconstructing module 400 is configured to reconstruct the complete human model with geometric details through a human skeleton prior and non rigid point cloud tracking.

The fusing module 500 is configured to perform, after obtaining a motion field of the complete human model with geometric details and motion of the rigid object, a fusion operation in time sequence and obtaining a reconstructed human model and a reconstructed rigid object model through the fusion operation.

According to the light field reconstruction apparatus of a dynamic scene of embodiments of the present disclosure, with the segmenting module, a human segmentation result is obtained via a pre-trained semantic segmentation network, and an object segmentation result is obtained according to a pre-obtained scene background; with the registering module, multiple frames of depth maps of the human segmentation result and the object segmentation result are fused to obtain a geometric model, a complete human model is obtained according to a pre-trained human model completion network, and the models are registered by point cloud registration and the registered models are fused to obtain a fused object model, so as to obtain a complete human model with geometric details and the object model; with the tracking module, motion of a rigid object is tracked through point cloud registration; with the reconstructing module, the complete human model with geometric details is reconstructed through a human skeleton prior and non rigid point cloud tracking; and with the fusing module, after obtaining a motion field of the complete human model with geometric details and motion of the rigid object, a fusion operation is performed in time sequence and a reconstructed human model and a reconstructed rigid object model are obtained through the fusion operation. The present disclosure improves the robustness of dynamic light field reconstruction in the human-object interaction scene, through point cloud tracking of the rigid object and reconstructing a three-dimensional model, then constraining the human skeleton tracking based on prior information of the model after obtaining the three-dimensional model. The prior of time sequence information and pose prior of human-object interaction collected are used to enhance the human skeleton tracking effect in the case of object occlusion, so as to obtain the robust human skeleton tracking in the case of occlusion, which realizes a light field reconstruction of a dynamic scene in the case of occlusion.

In addition, the terms "first" and "second" are only used for description purposes and cannot be understood as indicating or implying relative importance or implicitly indicating the number of indicated technical features. Thus, the features defined as "first" and "second" can explicitly or implicitly include at least one such feature. In the description of the present disclosure, "multiple" means at least two, such as two, three, etc., unless otherwise specifically defined.

In the description of this specification, reference to the description of the terms "an embodiment", "some embodiments", "example", "specific example", or "some examples" means that the specific features, structures, materials, or features described in combination with this embodiment or example are included in at least one embodiment or example of the present disclosure. In this specification, the illustrative expression of the above terms need not refer to the same embodiments or examples. Furthermore, the specific features, structures, materials, or features described may be combined in an appropriate manner in any one or more embodiments or examples. In addition, those skilled in the art can combine and combine different embodiments or examples described in this specification and the features of different embodiments or examples without contradiction.

Although the embodiments of the present disclosure have been shown and described above, it can be understood that the above embodiments are exemplary and cannot be understood as a limitation of the present disclosure. Those skilled in the art can change, modify, replace and transform the above embodiments within the scope of the present disclosure.

What is claimed is:

1. A light field reconstruction method of a dynamic scene, comprising:
   obtaining a human segmentation result via a pre-trained semantic segmentation network, and obtaining an object segmentation result according to a pre-obtained scene background;
   fusing multiple frames of depth maps of the human segmentation result and the object segmentation result to obtain a geometric model, obtaining a complete human model according to a pre-trained human model completion network, and registering the models by point cloud registration and fusing the registered models to obtain a fused object model, so as to obtain a complete human model with geometric details and the object model;
   tracking motion of a rigid object through point cloud registration;
   reconstructing the complete human model with geometric details through a human skeleton prior and non rigid point cloud tracking; and
   performing, after obtaining a motion field of the complete human model with geometric details and motion of the rigid object, a fusion operation in time sequence and obtaining a reconstructed human model and a reconstructed rigid object model through the fusion operation,
   wherein the motion of the rigid object is obtained by solving an optimization function,
   the optimization function comprises two optimization terms of color and geometry, expressions of the optimization function are as follows:

$$E_{object}(T) = \lambda_{color} E_{color} + \lambda_{geo} E_{geo}$$

$$E_{color} = \sum_{i \in N} \sum_{(p,q) \in \mathcal{R}} (C_p(f(T_i q)) - C(q))^2$$

$$E_{geo} = \sum_{i \in N} \sum_{(p,q) \in \mathcal{R}} (n_p^T(p - T_i q))^2$$

where, N is the number of objects, R is a set of corresponding points found via closest searching, p and q are the corresponding points of frame t and frame t−1, function C returns the color q of the point, $C_p$ is a pre-computed function continuous on a tangent plane of the point p, function f projects a three-dimensional point to the tangent plane, $T_i$ is the motion of the rigid object, $\lambda_{color}$ is a coefficient of the color optimization item and set to 0.1, $\lambda_{geo}$ is a coefficient of the geometric optimization term and set to 0.9, $E_{color}$ is a calculation expression of the color optimization term, which is calculated from color differences of adjacent points, and $E_{geo}$ is a calculation expression of the geometric optimization term, which is calculated from spatial position differences of adjacent points.

2. The light field reconstruction method of a dynamic scene according to claim 1, wherein the method further comprises:

removing a wrong part in the human segmentation result according to a projection result of the reconstructed rigid object under a current visual angle.

3. The light field reconstruction method of a dynamic scene according to claim 1, wherein obtaining the complete human model according to the pre-trained human model completion network comprises:

triggering to process the human model of a current frame with a trained depth learning network to obtain a complete human model, when an average weight of the geometric model reaches a specific preset threshold.

4. The light field reconstruction method of a dynamic scene according to claim 1, wherein the tracking through the human skeleton comprises: tracking through the human skeleton prior and non rigid point cloud, and adding new constraints when solving a position of a human skeleton node:

adding new constraints when solving the position of the human skeleton node:

$$E_{inter} = \lambda_{gmm} E_{gmm} + \lambda_{lstm} E_{lstm} + \lambda_{sp\_h1} E_{sp\_h}$$

where, $E_{gmm}$ is human pose data collected under an interaction between human and object, $E_{lstm}$ is a constraint item in time sequence, $E_{sp\_h}$ is a geometric intersection term, $\lambda_{gmm}$, $\lambda_{lstm}$, $\lambda_{sp\_h1}$ are coefficients of optimization terms respectively.

5. The light field reconstruction method of a dynamic scene according to claim 1, wherein the non rigid tracking of human surface nodes comprises:

jointly solving an optimization equation, wherein optimization variables are human shape $\beta_0$ and pose $\theta_0$, and ED non rigid motion field $G_0$, and the optimization equation is:

$$E_{comp}(G_0, \beta_0, \theta_0) = \lambda_{vd} E_{vdata} + \lambda_{md} E_{mdata}$$

where, the first item is a voxel data item, wherein $\lambda_{vd}$ is an optimization coefficient, $E_{vdata}$ defines an error between a SMPL model and a reconstructed geometric model:

$$E_{vdata}(\beta_0, \theta_0) = \sum_{\bar{v} \in T} \psi(D(W(T(\bar{v}; \beta_0, \theta_0); \beta_0, \theta_0)),$$

where, input of D(.) is coordinates of a point, and output is a SDF value of a bilinear interpolation of the coordinates of the point in the TSDF volume, $\psi(.)$ represents a robust Geman-McClure penalty function.

6. The light field reconstruction method of a dynamic scene according to claim 5, wherein the mutual action term $E_{mdata}$ is represented by the following point to plane distance:

$$E_{mdata} = \sum_{(\bar{v},u) \in C} \psi(n_u^T(W(T(\bar{v}; \beta_0, \theta_0)) - u)) + \sum_{(\bar{v}_c,u) \in P} \psi(n_u^T(\bar{v}_c - u)),$$

where, C is a closest point pair set of points $\bar{v}$ on the SMPL and points u on a complete model, P is a closest point pair set of vertexes $\bar{v}_c$ of a partial model and points u on the complete model, and $n_u$ is a normal vector of a point.

7. The light field reconstruction method of a dynamic scene according to claim 5, wherein for each 3D voxel v, $\tilde{v}$ represents a position warped through ED non rigid motion, N(v) represents the number of non empty voxels neighboring the voxel, D(v) represents a TSDF value of v;

calculating a current SDF value d(v) and updating a weight by the following formulas:

$$d(v) = (u - \tilde{v}) \text{sgn}(n_u^T(u - \tilde{v})), w(v) = 1/(1 + N(v)).$$

where, u is a three-dimensional point on the complete model corresponding to the $\tilde{v}$, $n_u$ is its normal vector, sgn(.) is a sign function and determined by positive and negative SDF values.

8. The light field reconstruction method of a dynamic scene according to claim 5, wherein through the SDF value and updating the weight, fusing according to a fusion strategy, and using a marching cubes algorithm, a complete mesh model with geometric details is obtained, the fusion strategy is:

$$D(v) \leftarrow \frac{D(v)W(v) + d(v)w(v)}{W(v) + w(v)}, W(v) \leftarrow W(v) + w(v).$$

where, D(V) represents a TSDF value of v, and W(v) represents a current accumulative weight.

9. A light field reconstruction apparatus of a dynamic scene, comprising:

a processor; and a memory for storing instructions executable by the processor, wherein the processor is configured to:

obtain a human segmentation result via a pre-trained semantic segmentation network, and obtain an object segmentation result according to a pre-obtained scene background;

fuse multiple frames of depth maps of the human segmentation result and the object segmentation result to obtain a geometric model, obtain a complete human model according to a pre-trained human model completion network, and register the models by point cloud registration and fuse the registered models to obtain a fused object model, so as to obtain a complete human model with geometric details and the object model;

track motion of a rigid object through point cloud registration;

reconstruct the complete human model with geometric details through a human skeleton prior and non rigid point cloud tracking; and perform, after obtaining a motion field of the complete human model with geometric details and motion of the rigid object, a fusion operation in time sequence and obtain a reconstructed human model and a reconstructed rigid object model through the fusion operation, wherein the motion of the rigid object is obtained by solving an optimization function, the optimization function comprises two optimization terms of color and geometry, expressions of the optimization function are as follows:

$$E_{object}(T) = \lambda_{color} E_{color} + \lambda_{geo} E_{geo}$$

$$E_{color} = \Sigma_{i \in N} \Sigma_{(p,q) \in R} (C_p(f(Tiq)) - C(q))^2$$

$$E_{geo} = \Sigma_{i \in N} \Sigma_{(p,q) \in R} (n_p^T(p - Tiq))^2$$

where, N is the number of objects, R is a set of corresponding points found via closest searching, p and q are the corresponding points of frame t and frame t−1, function C returns the color q of the point, $C_p$ is a pre-computed function continuous on a tangent plane of the point p, function f projects a three-dimensional point to the tangent plane, $T_i$ is the motion of the rigid object, $\lambda_{color}$ is a coefficient of the color optimization item and set to 0.1, $\lambda_{geo}$ is a coefficient of the geometric optimization term and set to 0.9, $E_{color}$ is a calculation expression of the color optimization term, which is calculated from color differences of adjacent points, and $E_{geo}$ is a calculation expression of the geometric optimization term, which is calculated from spatial position differences of adjacent points.

10. The light field reconstruction apparatus of a dynamic scene according to claim 9, wherein the processor is further configured to:
remove a wrong part in the human segmentation result according to a projection result of the reconstructed rigid object under a current visual angle.

11. The light field reconstruction apparatus of a dynamic scene according to claim 9, wherein the processor is further configured to:
trigger to process the human model of a current frame with a trained depth learning network to obtain a complete human model, when an average weight of the geometric model reaches a specific preset threshold.

12. The light field reconstruction apparatus of a dynamic scene according to claim 9, wherein the processor is further configured to:
track through the human skeleton prior and non rigid point cloud, and add new constraints when solving a position of a human skeleton node:
adding new constraints when solving the position of the human skeleton node:

$$E_{inter} = \lambda_{gmm} E_{gmm} + \lambda_{lstm} E_{lstm} + \lambda_{sp\_h1} E_{sp\_h}$$

where, $E_{gmm}$ is human pose data collected under an interaction between human and object, $E_{lstm}$ is a constraint item in time sequence, $E_{sp\_h}$ is a geometric intersection term, $\lambda_{gmm}$, $\lambda_{lstm}$, $\lambda_{sp\_h1}$ are coefficients of optimization terms respectively.

13. The light field reconstruction apparatus of a dynamic scene according to claim 9, wherein the processor is further configured to:
jointly solve an optimization equation, wherein optimization variables are human shape $\beta_0$ and pose $\theta_0$, and ED non rigid motion field $G_0$, and the optimization equation is:

$$E_{comp}(G_0,\beta_0,\theta_0) = \lambda_{vd} E_{vdata} + \lambda_{md} E_{mdata}$$

where, the first item is a voxel data item, wherein $\lambda_{vd}$ is an optimization coefficient, $E_{vdata}$ defines an error between a SMPL model and a reconstructed geometric model:

$$E_{vdata}(\beta_0,\theta_0) = \Sigma_{\bar{v} \in T} \psi(D(W(T(\bar{v};\beta_0,\theta_0);\beta_0,\theta_0)),$$

where, input of D(.) is coordinates of a point, and output is a SDF value of a bilinear interpolation of the coordinates of the point in the TSDF volume, $\psi(.)$ represents a robust Geman-McClure penalty function.

14. The light field reconstruction apparatus of a dynamic scene according to claim 13, wherein the mutual action term $E_{mdata}$ is represented by the following point to plane distance:

$$E_{mdata} = \Sigma_{(\bar{v},u) \in C} \psi(n_u^T(W(T(\bar{v};\beta_0,\theta_0))-u) + \Sigma_{(\tilde{v}_c,u) \in P} \psi(n_u^T(\tilde{v}_c-u)),$$

where, C is a closest point pair set of points $\bar{v}$ on the SMPL and points u on a complete model, P is a closest point pair set of vertexes $\tilde{v}_c$ of a partial model and points u on the complete model, and $n_u$ is a normal vector of a point.

15. The light field reconstruction apparatus of a dynamic scene according to claim 13, wherein for each 3D voxel v, $\tilde{v}$ represents a position warped through ED non rigid motion, N(V) represents the number of non empty voxels neighboring the voxel, D(v) represents a TSDF value of v;
the processor is further configured to calculate a current SDF value d(v) and update a weight by the following formulas:

$$d(v) = (u-\tilde{v}) \operatorname{sgn}(n_u^T(u-\tilde{v})), \quad w(v) = 1/(1+N(v)).$$

where, u is a three-dimensional point on the complete model corresponding to the $\tilde{v}$, $n_u$ is its normal vector, sgn(.) is a sign function and determined by positive and negative SDF values.

16. The light field reconstruction apparatus of a dynamic scene according to claim 13, wherein through the SDF value and updating the weight, fusing according to a fusion strategy, and using a marching cubes algorithm, a complete mesh model with geometric details is obtained, the fusion strategy is:

$$D(v) \leftarrow D(v)W(v) + d(v)w(v)/W(v) + w(v), W(v) \leftarrow W(v) + w(v).$$

where, D(v) represents a TSDF value of v, and W(v) represents a current accumulative weight.

* * * * *